Aug. 30, 1932. C. T. EARHART 1,874,175
FRAMING TABLE
Filed May 20, 1931
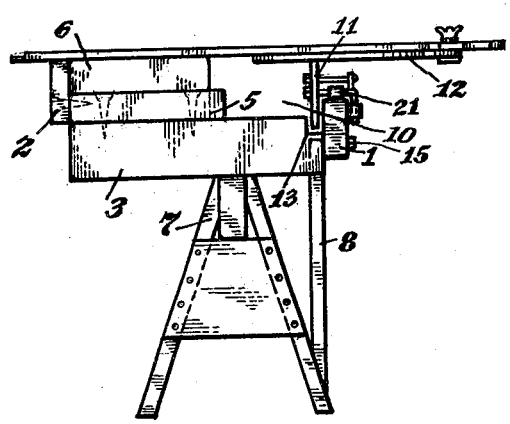
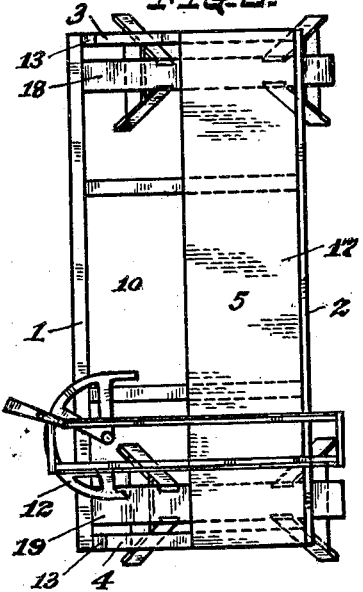
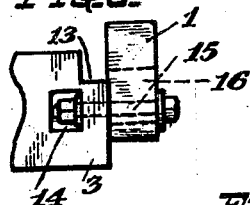
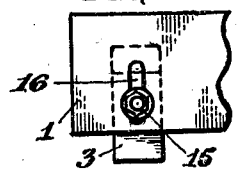
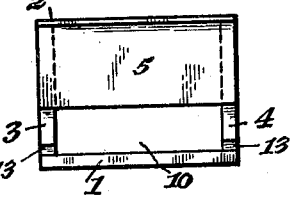
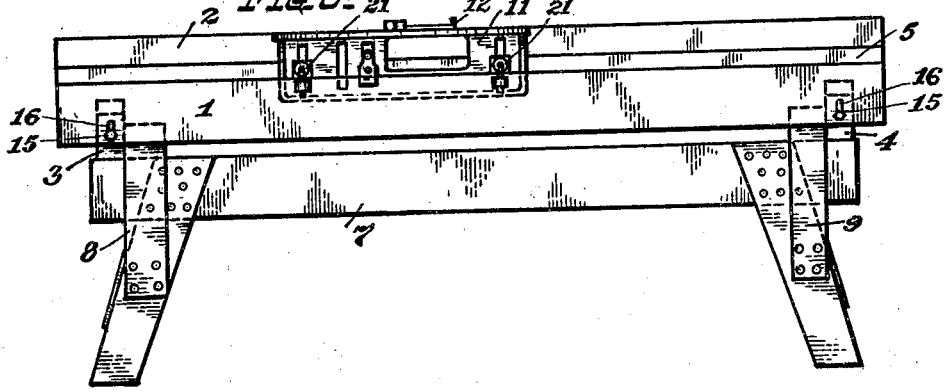
C. T. EARHART,
INVENTOR,
BY William A. Hartle,
ATTORNEY.

Patented Aug. 30, 1932

1,874,175

UNITED STATES PATENT OFFICE

CHARLES T. EARHART, OF PITTSBURGH, PENNSYLVANIA

FRAMING TABLE

Application filed May 20, 1931. Serial No. 538,863.

The present invention relates to a framing table intended to be used in connection with a type of power sawing device, which has been fully described in a certain United States Patent Number 1,832,283 dated November 17th, 1931, by the present inventor of which patent this application is a continuation in part.

The general purpose of the present table is to provide a table which may be readily transported from one construction job to another, or which may be made at any particular place where it is needed due to its simple constructional members.

The principal feature of the framing table is its top portion which is designed to accommodate the revolving blade of the power saw, and the adjustable front stringer as will be explained hereinafter adapts the table for use in connection with any thickness of lumber being sawn.

The table is usually made in three types, all of which follow the same general form. For use with heavy lumber of size 2" x 6" or 2" x 4" and of long length, a table is provided usually about two feet longer than the greatest length of lumber intended to be cut or sawn thereon, said table being in most instances about 18 feet in length; for intermediate size of material a form of table about 6 feet in length adapted to be mounted on a single carpenter's trestle or "saw horse" is provided; for very small sized material a very short type of table top is provided, usually about 3 feet in length, and it then is used like a mitre-box in connection with the sawing device used in above named application.

Details of the other features of the present device will be explained as the specification proceeds herein.

In the accompanying drawing forming part of the present specification, I have shown an embodiment of the device in hand.

Figure 1 is an end view of a movable frame, saw, and table top, mounted on a saw horse or carpenter's trestle.

Figure 2 is a plan view of the table as adopted for use in connection with the longest and largest size of material to be sawn, mounted on two carpenters' trestles as supports.

Figure 3 is a detail side view of the adjustable front stringer mounted on the end of one of the cross-bars of the table.

Figure 4 is a front view of Figure 3 taken from the right thereof.

Figure 5 is a plan view of the table top usually about three feet in length for use as a mitre-box, and for very small sized material.

Figure 6 is a front view of the table and appurtenant parts shown in Figure 1.

In the drawing as seen in Figures 1, 6, 3 and 4 particularly, the numeral 1 indicates a front stringer, 2, a rear stringer. The cross-bars 3 and 4 extend between the two stringers. On the cross-bars 3, 4 is mounted the longitudinal material supporting deck member 5. The material to be sawn is shown in Figure 1 by the numeral 6. It will be seen that the rear stringer 2 is secured to deck member 5, and cross-bars 3, and 4 etc. are secured to said member 5, while the front stringer 1 is adjustably secured to the cross-bars, in a manner shown in Figures 3 and 4 of the drawing.

When the device is mounted on a single trestle as shown in Figures 1 and 6 the cross-bars are secured on the top of the trestle 7, and two depending tie pieces 8, 9 secure the table top to the legs of the saw horses. In this way a rigid structure is provided.

The purpose of the rear stringer 2 is to form a "backing piece" against which the lumber being sawn abuts, and is held in position thereby. The aperture 10 in the table deck as explained in the parent application above referred to, is to provide room in which to operate the cutting blade of a power saw.

It will be noted also that in cases where the depending vertical limb 11 of the movable frame 12 is mounted on the inside of the front stringer 1, as shown in Figure 1, a recess 13, is provided in the cross-bars to permit said vertical limb to move along the front stringer. As the thickness of the lumber 6, varies, the front stringer needs at times to be elevated or lowered with reference to the cross-bars, and this is provided for in Figures 3 and 4 of the drawing, though other adjustable means may be used therefor. In the figures last named it is seen that an aperture 14 is made in the cross-bars 3 and 4 and a bolt 15 passed through a slot 16 in the front stringer 1, and thereby a proper elevation of the front stringer is obtained.

In the Figure 2 of the drawing, the cross-sectional form of the table top 17 is the same as shown in Fig. 1, the only difference is that the said top is mounted on two saw horses 18, 19, placed transversely to the table top as shown, and the length of the top increased to eighteen or twenty feet to accommodate long material.

In the Figure 5 is shown a plan view of the table top which is only about three feet long, but is of the same cross-section as that shown in Figure 1, having the rear stringer 2, the cross-bars 3 and 4, the front stringer 1, and the deck member 5 as before. This form of the device is for use with small sized material, in which the device acts as a miter box.

In Figures 1 and 2 I have shown the movable frame 12, of the sawing device, which rides on the front stringer 1 of the framing table by means of the rollers 21, and for a fuller and clear description of the operation and nature of the sawing device used with this present framing table reference is made to the above-mentioned parent application for patent.

It is seen that the portability of the present type of framing table is an important feature of the device. Also the simplicity of construction of the parts such as the rear and front stringers, the deck and cross-bars which can all be made of ordinary sizes of sawn lumber without any intricate cutting in order to shape them for use in making a table top is another valuable feature of the invention in hand.

I claim:—

1. In a portable table for sawing devices, a table top comprising a rear stringer forming an abutment for material being sawn on said table, a deck at a lower elevation than the top of the rear stringer and connected therewith, a number of cross-bars mounted beneath the deck, and a vertically adjustable front stringer on the cross-bars on which a sawing device can operate.

2. In a portable framing table for sawing devices, a table top comprising a rear stringer forming an abutment for material being sawn on said table, a material supporting deck at a lower elevation than the top of the rear stringer, a plurality of cross-bars mounted beneath the said deck at a lower elevation than the top of said deck, and of greater length than the width of the deck, a front stringer mounted on the cross-bars, and at an elevation normally beneath the top of the deck, adapted to accommodate the movable frame of a sawing device.

3. In a framing table for sawing devices, a table top comprising a rear stringer adapted to form an abutment for material being sawn on the table, a front stringer adapted to receive a sawing device thereon, a plurality of cross-bars between the stringers, each having a recess formed therein adjacent to the front stringer for accommodating the vertical limb of a sawing device, and a longitudinal deck member connected to the rear stringer and the cross-bars forming with the inner side of the front stringer a longitudinal table aperture in which downwardly projecting parts of a swing device can operate.

4. In a framing table for sawing devices, a rear stringer forming an abutment for material being sawn, a material supporting deck connected to the rear stringer, a plurality of cross-bars mounted beneath the deck, a front stringer on the cross-bars for reciprocally carrying a sawing device thereon, and positioned in spaced relation with said deck, an A-shaped supporting sawhorse beneath the cross-bars, and a pair of depending framing pieces connecting the cross-bars to the legs of the sawhorse to form a table having stable equilibrium.

In testimony whereof I affix my signature.

CHARLES T. EARHART.